US009549141B2

United States Patent
Dickens et al.

(10) Patent No.: US 9,549,141 B2
(45) Date of Patent: Jan. 17, 2017

(54) VIDEO SIGNAL TRANSMISSION

(71) Applicants: Adder Technology Limited, Cambridge (GB); Nexus Electronics Limited, Cambridge (GB)

(72) Inventors: Nigel Dickens, Cambridge (GB); Anthony Field, Cambridge (GB)

(73) Assignee: Adder Technology Limited, Cambridge (GB)

( * ) Notice: Subject to any disclaimer, the term of this patent is extended or adjusted under 35 U.S.C. 154(b) by 0 days.

(21) Appl. No.: 14/676,433

(22) Filed: Apr. 1, 2015

(65) Prior Publication Data
US 2015/0288911 A1    Oct. 8, 2015

(30) Foreign Application Priority Data
Apr. 4, 2014    (GB) .................................. 1406096.6

(51) Int. Cl.
| H04N 5/38 | (2006.01) |
| G09G 5/00 | (2006.01) |
| H04N 7/12 | (2006.01) |
| H04N 19/59 | (2014.01) |
| H04N 19/127 | (2014.01) |
| H04N 19/136 | (2014.01) |
| H04N 19/587 | (2014.01) |

(52) U.S. Cl.
CPC .................. *H04N 5/38* (2013.01); *G09G 5/00* (2013.01); *H04N 7/12* (2013.01); *H04N 19/127* (2014.11); *H04N 19/136* (2014.11); *H04N 19/59* (2014.11); *H04N 19/587* (2014.11)

(58) Field of Classification Search
None
See application file for complete search history.

(56) References Cited

U.S. PATENT DOCUMENTS

| 6,025,878 A * | 2/2000 | Boyce | ....................... G06T 3/40 |
| | | | 348/556 |
| 6,970,183 B1 * | 11/2005 | Monroe | ................. G08B 7/062 |
| | | | 348/143 |
| 7,088,398 B1 * | 8/2006 | Wolf | ....................... H04L 1/203 |
| | | | 348/423.1 |

(Continued)

FOREIGN PATENT DOCUMENTS

EP    2 234 401    9/2010

OTHER PUBLICATIONS

GB Search Report dated Sep. 29, 2015 from GB Application No. GB1406096.6.

*Primary Examiner* — Paulos M Natnael
(74) *Attorney, Agent, or Firm* — Beyer Law Group LLP

(57) ABSTRACT

A digital video signal has a frame rate and a resolution within a range of resolutions. If the resolution of the received digital video signal is in a lower resolution range then it is not compressed or if in a higher resolution range the video color data is compressed by a constant compression ratio. Frames of digital color samples are transmitted and frames of digital color samples are received at the same frame rate. The received compressed digital color samples are expanded by a constant expansion ratio when transmitted in a compressed format and not expanded if transmitted in the uncompressed video format. A digital video signal is output with a resolution the same as the resolution of the original digital video signal.

30 Claims, 7 Drawing Sheets

(56) References Cited

U.S. PATENT DOCUMENTS

| | | | |
|---|---|---|---|
| 8,599,311 B2* | 12/2013 | Nissan-Cohen ... | H04N 21/4122 348/552 |
| 8,776,163 B2* | 7/2014 | Cirstea ................... | H04N 7/102 710/65 |
| 8,885,102 B1* | 11/2014 | Suzuki .................... | H04N 11/08 348/488 |
| 2006/0242669 A1 | 10/2006 | Wogsberg | |
| 2008/0250184 A1* | 10/2008 | Sheafor ................. | G06F 13/385 710/306 |
| 2009/0049498 A1* | 2/2009 | Li .......................... | G09G 5/006 725/127 |
| 2010/0083343 A1* | 4/2010 | Ku ......................... | G06F 3/1431 725/149 |
| 2014/0015873 A1* | 1/2014 | Kasai ....................... | G09G 3/36 345/698 |
| 2015/0288919 A1* | 10/2015 | Labosco .................. | G09G 5/00 348/445 |
| 2015/0373369 A1* | 12/2015 | Jalali .................... | H04N 19/132 375/240.12 |

* cited by examiner

VIDEO SIGNAL TRANSMISSION

This application claims priority to GB Application No. 1406096.6, filed on Apr. 4, 2014, the contents of which are incorporated herein by reference in its entirety.

The present invention relates to transmitting video signals, and in particular to providing a high bandwidth communication channel for transmitting video signals from a source of video to a sink of video over large distances.

There are a number of applications in which a large bandwidth may be needed in order to transmit large amounts of video data from a source of video signals, such as a computer, to one or more sinks of video signals, such as one or more display devices or monitors. For example, the Digital Video Interface (DVI) provides a standard for transmitting digital video data between a source and sink, such as a computer and its monitor, over a single cable with a DVI connector at each end. DVI uses transition minimised differential signalling (TMDS) for the electrical connection and provides one or two TMDS links depending on the screen resolution and timings desired. Hence, two TMDS links can provide the video signal bandwidth required by a high resolution display device. The two TMDS links share the same clock signal allowing the bandwidth to be evenly divided between the two links.

When a single link is provided, also referred to as DVI single link, the DVI connector, has a first arrangement of pins, to provide the electrical connectors for the wires within the cable providing the single link. However, when two links are provided, also referred to as DVI dual link, the same DVI connector includes further pins, in addition to the single link pin arrangement, with different groups of pins for each of the links, to provide the electrical connections for the wires within the DVI cable. Hence, for example, a DVI cable with DVI connectors can be connected between a computer and monitor which are close to each other so as to allow ether a single DVI link or dual DVI link to be provided depending on the DVI cable used, the graphics controller of the computer and the resolution of the display.

This may be practicable where the source and sink are close to each other. However, there are a large number of applications in which the source and sink may be quite distant for example tens or hundreds of meters. Such applications include signage, in which a display device is remote from the source of video and also extender applications in which a computer and its input/output peripherals are remote, for example a computer and remote keyboard, video and mouse ("KVM") console.

The practical maximum length for a DVI cables depends on the pixel clock frequency. Cable lengths up to about 5 m will work for display resolutions up to 1920×1200. Longer cables up to about 10 m can be used with display resolutions of 1280×1024 or lower. However, for greater distances, a DVI booster can be used to help mitigate signal degradation. However, a DVI cable cannot be used to provide a high bandwidth connection between a source and sink of video over distances greater than about 15 m owing to degradation of the electrical signals as they travel along the physical wires of the cable.

Various technologies exist for extending High Definition (HD) digital video signals (e.g. 1080 p, 1920×1080×60 Hz) over a significant distance without compressing the data. For example 50 m extension technology can use a line driver at the transmit end and an equaliser at the receive end and a CAT6/7 extension cable. This is a reasonably cost effective approach. For greater distances, e.g. 100 m to 150 m, extension technology using HDBaseT technology, such as that provided by Valens Semiconductor, can be used. This enables HD (1080 p) signals to be transmitted over 150 m of CAT5e or better cable and is also reasonably cost effective. Optical extension technology can also be used for transmitting high frequency signals over long distances but is relatively expensive. Various bandwidths may be used at increasing cost. A 6 Gb/s link provides sufficient bandwidth to transmit uncompressed HD digital video signals.

However, for any given extension technology, the digital signal bandwidth on the extension link is limited. In general, increasing the extension link bandwidth increases cost.

To avoid the need to use more expensive extension technologies and take advantage of the flexible characteristics of network transmission links, one approach is to apply compression, such as H264, motion JPEG, run length encoding, sending only data that has changed from one frame to the next, and other proprietary techniques. Such schemes are known in the art, but usually deliver variable compression ratios and thus tend to require a frame store at one or both ends of the extension link. This adds additional complexity and increases cost. This increase in cost needs to be balanced against the savings of using lower bandwidth extension links.

Hence, a lower cost extension technology that can provide comparable video over a lower bandwidth extension link without using the higher bandwidth extension link normally required would be advantageous. Avoiding the need to use frame stores would be particularly advantageous.

A first aspect of the invention provides a video transmission system. The system can comprise a transmitter and a receiver. The transmitter can include an input arranged to receive a digital video signal having a frame rate and wherein the digital video signal has a resolution within a range of resolutions. The transmitter can be configured, or can include a detector, to detect whether the resolution of the received digital video signal is in a lower resolution range or a higher resolution range. The transmitter can further include a compressor configured to compress video colour data of the received digital video signal by a constant compression ratio when it is detected that the resolution of the received digital video signal is in the higher resolution range and wherein no compression is applied to video colour data of the received digital video signal when it is detected that the resolution of the received digital video signal is in the lower resolution range. An output of the transmitter can be arranged to transmit frames of digital colour samples at the same frame rate as the frame rate of the received digital video signal. The receiver can include an input arranged to receive frames of digital colour samples from the transmitter. The receiver can be configured, or can include a detector configured, to detect whether the received digital colour samples were transmitted in a compressed format or an uncompressed format. The receiver can further include an expander configured to expand the received compressed digital colour samples by a constant expansion ratio when it is detected that the received digital colour samples were transmitted in a compressed format, and wherein no expansion is applied to the received digital colour samples when it is detected that the received digital colour samples were transmitted in the uncompressed video format. An output of the receiver can be arranged to output a digital video signal with a resolution the same as the resolution of the digital video signal received at the input of the transmitter.

Hence, the video transmitter and video receiver can be used to transmit video data for a range of resolutions over greater distances by using a lower bandwidth connection or link between them and by sending video data in compressed on uncompressed formats. The frame rate and resolution of the output video signal after transmission is the same as the frame rate and resolution of the original video signal before transmission. The system can automatically send either the uncompressed video data or a compressed version depending on whether the link between them has sufficient bandwidth or not for the original digital video signal.

The transmitter can not include a frame store. The compressor can be configured to operate on lines of pixels or video data. The compressor can include one or more video line delay elements. The video line delay element or elements can be arranged to allow averaging over pixels of the same video line of a frame and/or averaging of pixels on different video lines of a frame.

The receiver can not include a frame store. The expander can be configured to operate on lines of pixels or video data. The expander can include one or more video line delay elements. The video line delay element or elements can be arranged to increase the resolution of pixels of the same video line of a frame and/or to increase the resolution of pixels on different video lines of a frame.

The constant compression ratio can be one half and/or the constant expansion ratio can be two. This allows the amount of video data sent over the link effectively to be halved.

The digital video signal can be a DVI video signal. The lower resolution range can correspond to single link DVI and the higher resolution range can correspond to dual link DVI.

The digital video signal can be a HDMI video signal. The lower resolution range can correspond to a HDMI signal with a pixel clock frequency less than 165 MHz and the higher resolution range can correspond to a HDMI signal with a pixel clock frequency greater than 165 MHz.

The digital video signal can be a DisplayPort video signal. The lower resolution range can correspond to a DisplayPort signal with an aggregate negotiated data rate less than 5.4 Gb/s and the higher resolution range can correspond to a DisplayPort signal with an aggregate negotiated data rate more than 5.4 Gb/s.

The transmitter can include a colour space converter configured to convert RGB video data into luminance or luma and chrominance or chroma video data. The receiver can include a colour space converter configured to convert luminance or luma and chrominance or chroma video data into RGB video data.

The compressor can include or comprise a chroma sub-sampler arranged to operate on the chrominance video data. The expander can include or comprise a chroma up-sampler arranged to operate on the chrominance video data. The chroma sub-sampler can be configured to convert data from 4:4:4 format to 4:2:0 format. The chroma up-sample can be configured to convert data from 4:2:0 format to 4:4:4 format.

The chroma sub-sampler can include a first video line delay element arranged to provide chrominance averaging over pixels of different video lines.

The chroma sub-sampler can include a second video line delay element arranged to allow selection of a video line of an averaged first type of chrominance data and a video line of an averaged second type of chrominance data.

The chroma up-sampler can include a first video line delay element arranged to allow selection of a first type of chrominance data and a second type of chrominance data for output on the same video line.

The transmitter can include a switch operable either to supply the digital colour samples in the uncompressed format to the output of the transmitter or to supply the digital colour samples in the compressed format to the output of the transmitter. The receiver can include a switch operable to supply the digital video signal including digital colour data obtained from the digital colour samples received in the uncompressed format to the output or to supply the digital video signal including digital colour data obtained from the digital colour samples transmitted in the compressed format.

The switch of the transmitter and/or the switch of the receiver can be operable responsive to detection of whether the resolution of the digital video signal is in the lower resolution range or the higher resolution range.

The system can further comprise a cable connected between the transmitter and receiver. The cable can include a plurality of twisted wire pairs. The cable can be a network cable.

The cable can include not more than four twisted wire pairs and in particular only four twisted wire pairs. The digital colour samples can be transmitted over three of the twisted wire pairs and a video clock signal can be transmitted over the fourth twisted wire pair. The video clock signal can be a pixel clock signal. The cable can be a CAT6 or CAT7 grade twisted pair cable. Such cables have been found to be very suitable for video extension over 50 m using a line driver and line equaliser technique.

The cable can be at least 10 m long. The cable can be approximately 50 m long.

The video transmission system can be a KVM extender.

The video transmitter can be provided as a part of a device which includes the source of video data. The video receiver can be provided as part of a device which includes the sink of video data. For example, the receiver circuit may be integrated into a projection device. Other applications can include integrating the transmitter or receiver into industrial computers or industrial KVM consoles.

The video transmitter can be provided separate to a device which includes the source of video data. The video receiver can be separate to a device which includes the sink of video data.

The device which includes the source of video data can be a computer. The device which includes the sink of video data can be a monitor, display device, sign, projector, video wall controller or television.

A second aspect of the invention provides a video transmission method. The method can include receiving a digital video signal having a frame rate at an input of a transmitter and wherein the digital video signal has a resolution within a range of resolutions. The method can include detecting whether the resolution of the received digital video signal is in a lower resolution range or a higher resolution range. The method can include compressing video colour data of the received digital video signal by a constant compression ratio when the resolution of the received digital video signal is detected to be in the higher resolution range and not compressing the video colour data of the received digital video signal when the resolution of the received digital video signal is detected to be in the lower resolution range. The method can include transmitting frames of digital colour samples from an output of the transmitter to an input of a receiver. The method can include receiving frames of digital colour samples at the input of the receiver at the same frame rate as the video signal were transmitted by the transmitter. The method can include detecting whether the received digital colour samples were transmitted in a compressed format or an uncompressed format. The method can include expanding the received compressed digital colour samples by a constant expansion ratio when it is detected that the received digital colour samples were transmitted in a compressed format and not expanding the received digital colour samples when it is detected that the received digital colour samples were transmitted in the uncompressed video format. The method can include outputting a digital video signal at an output of the receiver with a resolution the same as the resolution of the digital video signal received at the input of the transmitter.

The constant compression ratio can be one half and/or the constant expansion ratio can be two.

The compression can be carried out without using a frame store. The compression can be done using only lines of pixels or video data. The compression can include averaging over pixels of the same video line of a frame and/or averaging of pixels on different video lines of a frame.

The expanding can be carried out without using a frame store. The expanding can be done using only lines of pixels or video data. The expanding can include increasing the resolution of pixels of the same video line of a frame and/or increasing the resolution of pixels on different video lines of a frame.

The digital video signal can be a DVI video signal. The lower resolution range can correspond to single link DVI and the higher resolution range can correspond to dual link DVI.

The digital video signal can be a HDMI video signal. The lower resolution range can correspond to a HDMI signal with a pixel clock frequency less than 165 MHz and the higher resolution range can correspond to a HDMI signal with a pixel clock frequency greater than 165 MHz.

The digital video signal can be a DisplayPort video signal. The lower resolution range can correspond to a DisplayPort signal with an aggregate negotiated data rate less than 5.4 Gb/s and the higher resolution range can correspond to a DisplayPort signal with an aggregate negotiated data rate more than 5.4 Gb/s.

The transmitter can convert RGB video data into luminance or luma and chrominance or chroma video data. The receiver can convert luminance or luma and chrominance or chroma video data into RGB video data.

Compressing can include or comprise sub-sampling the chrominance video data. The expanding can include or comprise up-sampling the chrominance video data.

Sub-sampling the chrominance video data can include introducing a first video line delay to average chrominance over pixels of different video lines.

Sub-sampling the chrominance video data can include introducing a second video line delay and selecting a video line of an averaged first type of chrominance data or a video line of an averaged second type of chrominance data.

Up-sampling the chrominance video data can include introducing a first video line delay and selecting a first type of chrominance data and a second type of chrominance data for output on the same video line.

The method can further comprise selectively supplying digital colour samples in the uncompressed format or digital colour samples in the compressed format to the output of the transmitter.

The method can further comprise selectively supplying the digital video signal including digital colour data obtained from the digital colour samples in the uncompressed format or the digital video signal including digital colour data obtained from the digital colour samples in the compressed format to the output of the receiver.

The cable can include a plurality of twisted wire pairs.

The cable can include only four twisted wire pairs. The digital colour samples can be transmitted over three of the twisted wire pairs. A video clock signal can be transmitted over the fourth twisted wire pair.

The digital video signal can be transmitted over a distance of at least 10 m.

The method can further comprise transmitting peripheral data from the receiver to the transmitter over a cable. The peripheral data can include keyboard and/or mouse data.

Embodiments of the invention will now be described in detail, by way of example only, and with reference to the accompanying drawings, in which.

Figure 1:
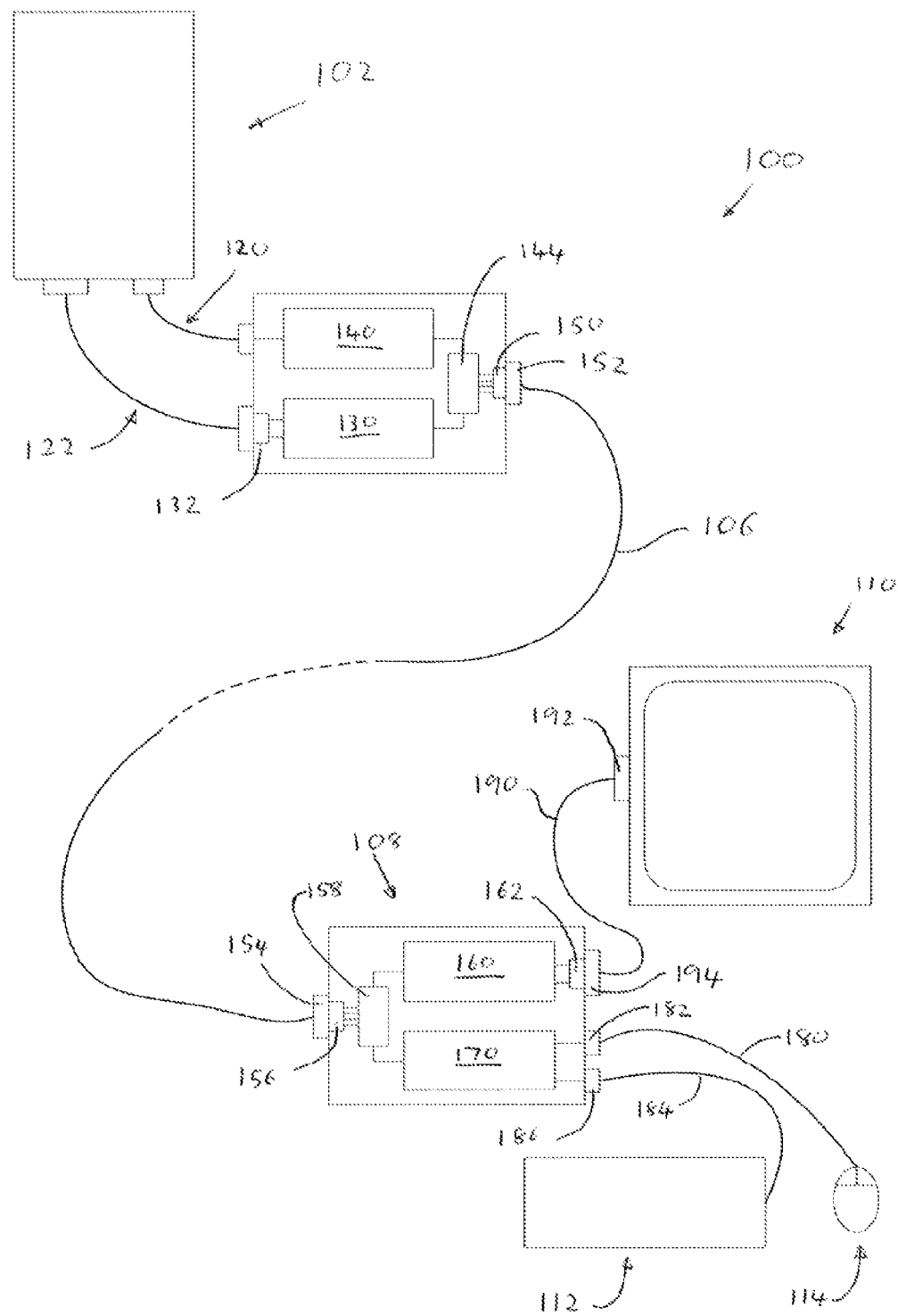
FIG. 1 shows a schematic block diagram of a video signal transmission system of the invention.

With reference to FIG. 1, there is shown a system 100 including a computer 102, a transmitter 104, a receiver 108, a cable 106 connected between the transmitter and receiver, a monitor 110, a keyboard 112 and a mouse 114. The illustrated system corresponds to an extended KVM system in which the KVM console 110, 112, 114 can be used to operate a remote computer 102 over a significant distance, e.g. 50 m.

The computer 102 is connected to the transmitter 104 by a USB cable 120 having USB connectors and which passes peripheral signals from the keyboard and mouse to the computer using the USB protocol. The computer 102 is also connected to the transmitter 104 by a DVI cable 122 with a DVI connector at both ends and which supplies video signal output from the graphics controller of the computer to the transmitter 104. The digital video signal output from the computer has a frame rate and a resolution. The resolution of or associated with the digital video signal can be within a range of values supported by the video standard. The transmitter 104 and received 108 of the system can operate in two different modes depending on whether the resolution of the digital video signal input to the transmitter is in a higher resolution range, in which case the video data is compressed before transmission, or in a lower resolution range, in which case the video data is not compressed before transmission. Irrespective, the digital video signal is eventually output to the monitor at the same frame rate and with the same resolution as the digital video signal originally input to the transmitter. Hence, the computer and monitor act largely as though connected directly together by a local cable, with the transmitter and receiver automatically taking care of any compression and expansion of video data, if needed, and dependent on the digital video signal input to the transmitter.

The transmitter 104 includes video circuitry 130 for handling video signals and also peripheral circuitry 140 for handling peripheral data. The peripheral data circuitry 140 and video signal circuitry 130 are each connected to differential line driver/receiver circuitry 144, which in turn is connected to a connector 150 for receiving an RJ45 jack 152 which terminates a first end of a CAT7 four twisted wire pair cable 106. The CAT7 cable includes shielded foiled twisted pairs. Other categories of cable can also be used, but a Category 5e, or better, shielded twisted pair cable is used in order to maintain compliance with radio frequency and energy emission regulations in the UK and to ensure a suitably high level of immunity to electromagnetic disturbances. For example, for a resolution of 2560×1600 at 60 Hz a 50 m length of CAT7, CAT6a (shielded) or CAT5e (shielded) cable can be used. A suitable CAT7 cable is the Uninet 7120 data cable available from Dätwyler Cables GmbH.

The four twisted wire pair cable 106 has a significant length, e.g. 50 m, as indicated by the dashed line segment in FIG. 1. A second end of the cable 106 is terminated by a further RJ45 jack 154 which is similarly received in a connector 156 of receiver 108.

In the receiver, 108, the connector 156 is connected to differential line driver/receiver circuitry 158 which is connected to both video circuitry 160 and peripheral circuitry 170. The receiver 108 includes a female DVI connector in communication with the video circuitry 160. The receiver 108 includes a first USB connector and a second USB connector each connected to the peripheral circuitry 170. The peripheral circuitry 170 can include a USB hub for handling two USB data paths and also a local USB host for emulating the local connection of a USB host by outputting various USB signals as required by the USB standard.

The mouse 114 is connected by a mouse cable 180 terminated by a USB plug connector 182 to the first USB connector and the keyboard is connected by a keyboard cable 184 terminated by a further USB plug connector 186 to the second USB connector. The monitor 110 is connected by a DVI cable 190 terminated by a first DVI connector 192, connected to a female DVI connector on the monitor, and a second DVI connector 194, connected to the female DVI connector of the receiver.

The transmitter 104, cable 106 and receiver 108 can be used to extend the distance of either a single link DVI connection or a dual link DVI connection. When computer video cable 122 is a dual link DVI cable and monitor cable 190 is a dual link DVI cable, then a dual link DVI extender can be provided by transmitter 104, cable 106 and receiver 108. Also, when computer video cable 122 is a single link DVI cable and monitor cable 190 is a single link DVI cable, or if a one of the cables 122, 190 is a dual-link DVI cable, then a single link DVI extender can be provided by the same transmitter 104, cable 106 and receiver 108 for single-link video resolutions.

The four twisted wire pair cable 106 provides four communications channels. A first of these is used to provide a channel for sending peripheral data from the mouse and keyboard as input to the computer but by extracting the peripheral data from the USB standard signals and sending the peripheral data in a non-USB standard way over a first one of the twisted wire pairs. The peripheral circuitry 140 in the transmitter 104 receives the peripheral data and outputs signals according to the USB standard to the computer 102 so as to provide a peripheral data communication channel. The peripheral circuitry 140 can also generate and output signals to the computer emulating the local connection of a USB mouse and USB keyboard to the computer.

The remaining three twisted wire pairs of the cable 106 hence provide three video data transmission channels. As described below, the clock signal and an operating mode signal can be sent over these pairs while video data is not being transmitted so as to communicate the clock signal frequency to the receiver. In other embodiments, in which no peripheral data is sent or in which a greater number of twisted wire pairs is available, then the video clock signal can be sent on its own twisted wire pair.

The details of the peripheral data are not described in greater detail, so as not to obscure the nature of the present invention which relates more to the video signal transmission.

Figure 2:
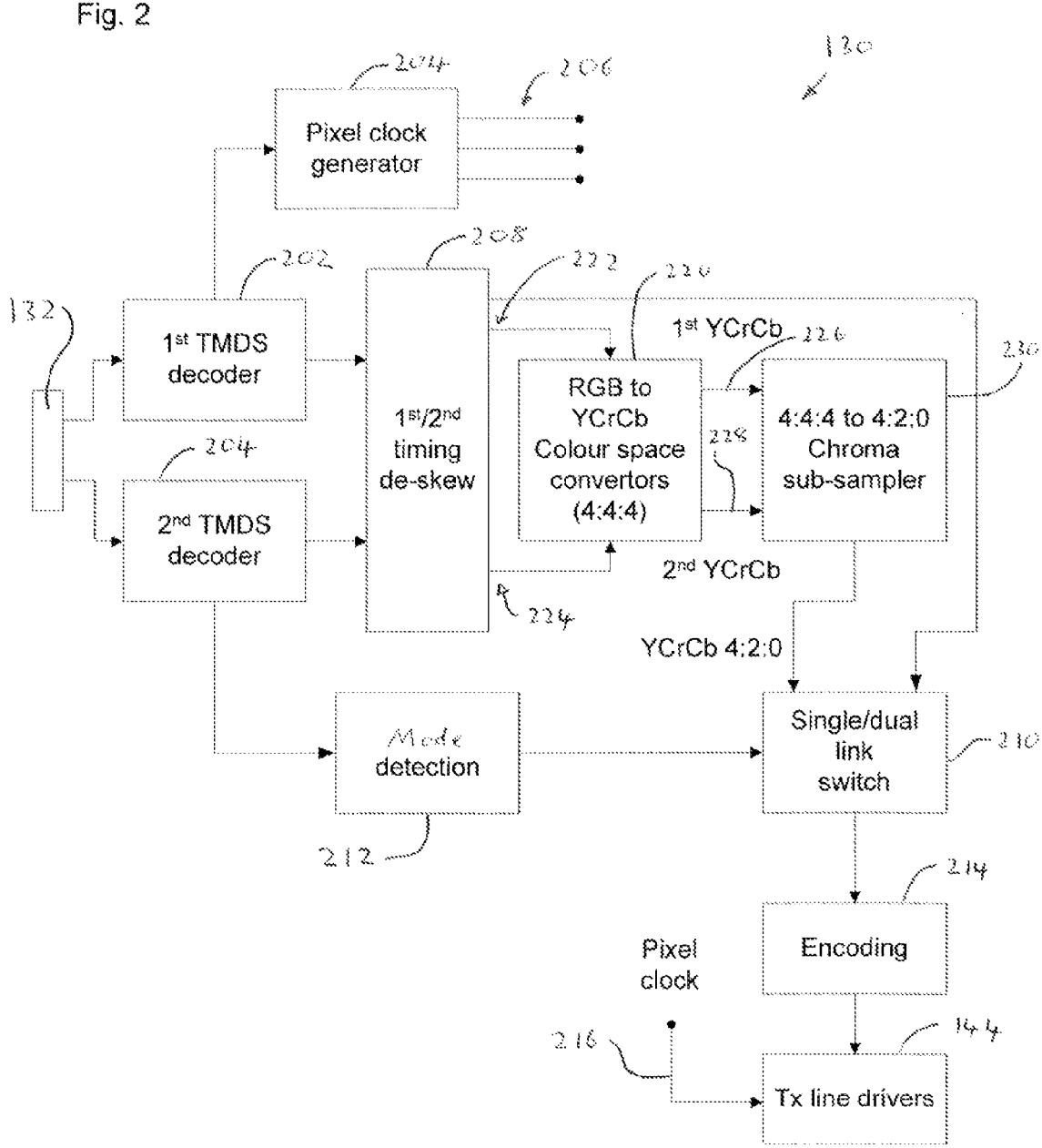
FIG. 2 shows a schematic block diagram of a first embodiment of a transmitter part of the video signal transmission system shown in FIG. 1.

With reference to FIG. 2, there is shown a schematic block diagram of the video circuitry 130 of a first embodiment of the transmitter 104. The video circuitry includes a standard DVI female connector 132. The contacts for a first group of pins used for a single link DVI connection are connected to a first TMDS decoder 202 and the contacts for a second group of pins used for the second link of a dual link cable are connected to a second TMDS decoder 204. A suitable device for each of the TMDS decoders 202, 204 is the Sil 1161 DVI receiver chip as provided by Silicon Image Inc., of California, USA. The first TMDS decoder 202 is used in both single link and dual link modes, whereas the second TMDS decoder 204 is used only in the dual link mode of operation. The first TMDS decoder 202 receives the TMDS encoded red, green and blue components of the video signal and a pixel clock signal for the single DVI link and outputs the decoded clock signal and red, green and blue video signals. The second TMDS decoder 204 receives the TMDS encoded red, green and blue components of the video signal only for the second DVI signal as the pixel clock signal is common to the video data on both links.

The transmitter video circuitry 130 includes a pixel clock generator circuit 204 in communication with the first TMDS decoder 202 and which receives the decoded pixel clock signal and outputs a plurality of pixel clock signals on a plurality of lines 206 which are supplied to other parts and components of the video circuitry 130.

The video circuitry 130 includes a de-skew circuit or device 208 which can receive as input the decoded R, G, B video data from the first and second TMDS decoders. The timing de-skew device 208 operates to remove any timing skew between the R, G, & B signals received over the different physical wires of the DVI cable 122 and so that the R, G, and B video data is temporally aligned. A first output of the de-skew device 208 is connected to a first input of a switch 210 which can be used to select which video data to be transmitted. The first output of de-skew device 208 is used in a single link mode of operation to supply the de-skewed R, G, B video data to switch 210. A mode detection device 212 is connected to the second TMDS decoder 204. When the second TMDS decoder 204 receives DVI signals at its input, then it outputs a signal to the mode detection device 212 which signals that a dual-link mode is required. The mode detection device, then outputs a signal signifying a dual-link mode of operation to the switch 210 which switches to connect a second input receiving dual link mode R, G, B data to its output. Otherwise, mode detection device 212 outputs a signal to switch 210 to connect its first input receiving the single link mode R, G, B data to its output.

The output of the switch 210 is connected to an encoder 214 which encodes the received video data using 8b10b encoding and supplies red, green and blue video signals in 4:4:4 RGB video format to line driver circuit 144 to transmit each of the red, green and blue video signals differentially over a different respective one of three of the twisted wire pairs of cable 106. The pixel clock signal is also supplied by line 216 to the line driver circuit 144 for transmission over the twisted wire pair cable 106.

Whenever a new or changed video resolution is detected from the video source, the three twisted wire pairs used to transmit the video colour data are switched briefly (e.g., for less than a second) to a different mode which carries a continuous clock signal on two of the twisted wire pairs and a first or a second low-frequency signalling 'tone' on a third of the twisted wire pairs. The transmitted tone signal is used by the receiver to detect this special mode of operation and also to detect whether the system is to operate in single link mode or dual link mode. Two different low-frequency signalling tones are used, a first to indicate single-link mode and a second to indicate dual-link mode, as a way of transmitting this information to the receiver 108 before any actual video colour data is transmitted. A pixel clock regenerator circuit 302 of the receiver accurately measures and stores the clock frequency, and sets the clock regeneration circuit to generate a local clock signal at the same frequency. The pixel clock circuit 302 uses the received data to finely trim its pixel clock output so that it keeps in synchronisation with the received pixel data.

Figure 3:
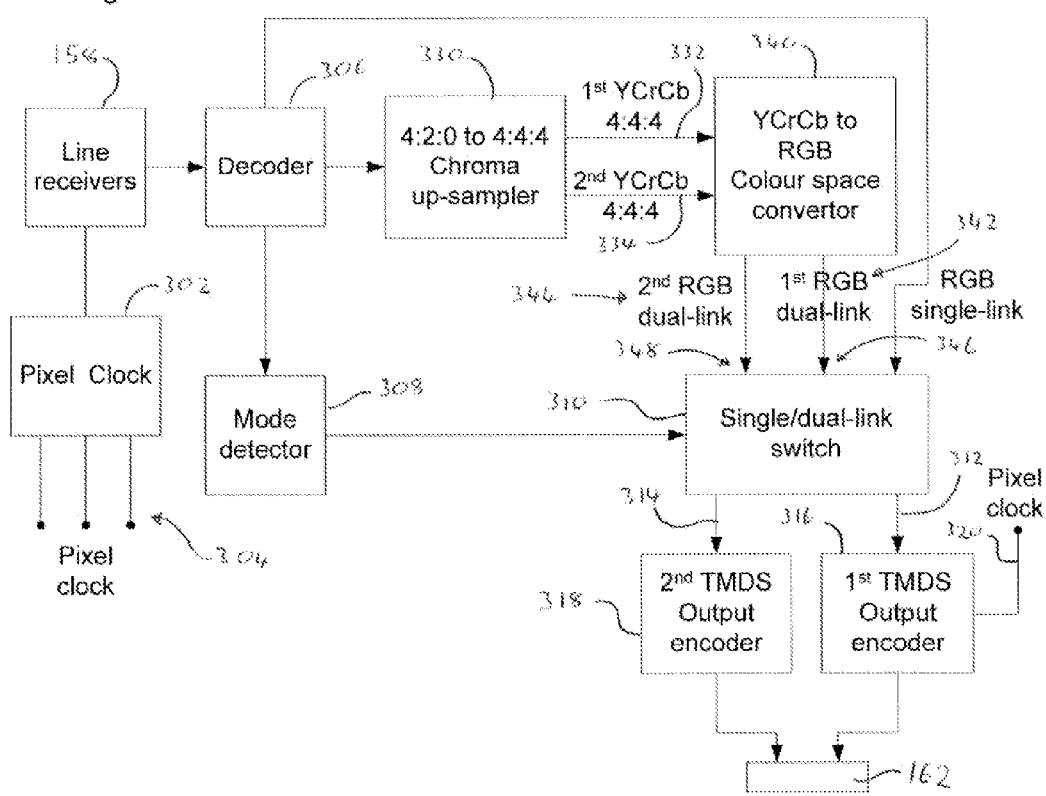
FIG. 3 shows a schematic block diagram of a first embodiment of a receiver part of the video signal transmission system shown in FIG. 1.

With reference to FIG. 3, there is shown a schematic block diagram of the video circuitry 160 of a first embodiment of the receiver 108. The receiver video circuitry 160 is essentially constructed and operates as a mirror image of, or in reverse to, the transmitter video circuitry 130. The receiver video circuitry 160 includes differential mode line receiver circuitry 158 which receives the signals differentially transmitted over the four twisted wire pairs of cable 106. As noted above, the line receiver circuit 158 outputs the transmitted pixel clock signal to a pixel clock regeneration circuit 302 which measures the transmitted clock signal frequency and generates and outputs a plurality of local pixel clock signals on a plurality of lines 304 for use by other parts or components of the video circuitry 160. The clock regeneration circuit 302 can use the received video pixel colour data to fine trim the clock signal so that it remains approximately phase locked with the received video pixel colour data. Techniques for synchronising clock signals to data in this way are generally known in the art.

The R, G and B video signals encoded in 8b10b format are received over three of the twisted wire pairs and are passed as output from the receiver circuitry to a decoder 306 which decodes the video data out of 8b10b format. An output of decoder 306 is connected to as an input to a link mode detection device or circuit 308, an output of which is connected as an input to a switch 310. Switch 310 has a first output 312 connected as an input to a first TMDS output encoder 316 and a second output 314 connected as an input to a second TMDS output encoder 318. A suitable device for the first and second output encoders 316, 318 is a Sil164 DVI transmitter as provided by Silicon Image, Inc. of California, USA. The output of each TMDS encoder 318, 316 is connected to the standard DVI female connector 162. The output of the first TMDS encoder 316 is connected to the contacts of the DVI connector 162 used to provide the video and clock signals for single link DVI and the output of the second TMDS encoder 318 is connected to the contacts of the DVI connector 162 used to provide the video signals only for dual link DVI. The first TMDS output encoder 316 also receives as an input the pixel clock signal on line 320.

The switch 310 has a first input in communication with a first output of the decoder 306 and which can receive the decoded 4:4:4 RGB video signal from decoder 306 in a single link mode of operation. The switch 310 also has a second and third input which can receive another video signal in a dual link mode of operation. Decoder 306 can output a signal indicating when a dual link mode of operation is occurring based on the video data received over the twisted wire pair cable, for example by inserting ancillary control information into the video stream during video blanking. The dual link detector circuit 308 then outputs a signal signifying the dual link mode of operation and switch 310 operates to connect its second input to its first output respectively. Otherwise, the dual link detector circuit 308 outputs a signal signifying the single link mode of operation and switch 310 operates to connect its first input to its first output. The third input to the switch 310 can always be connected to the second output 314 to the second TMDS encoder 318 as output 314 is only ever used in dual link mode. In single link mode the second TMDS encoder 318 output is disabled, i.e. TMDS data is not driven to the monitor on the second output, and in this way the monitor can detect the single or dual link mode operation.

Hence, when the video source is supplying a single link DVI signal to transmitter 104, no DVI video data is detected by 2nd TMDS decoder 204 and so detection circuit 212 does not detect a dual link mode of operation and so switch 210 is set to connect the first output of de-skew circuit 208 to the output of the switch and the full 4:4:4 RGB video data is passed from 1st TMDS decoder, via de-skew circuit 208, to encoding circuit 214 and supplied to line driver circuit 144 for transmission over three of the twisted wire pairs of cable 106.

At the receiver, 108, the line receiver circuit 158 receives the R, G, B video signals and the decoder 306 determines a single link mode and outputs a signal to mode detector circuit 308 which does not detect a dual-link mode of operation. Hence, switch 310 is set to connect its first input to its first output 312 and passes the received 4:4:4 RGB video data from decoder 306 to the 1st TMDS output encoder 316, which also receives the received pixel clock signal as an input. The 1st TMDS output encoder outputs TMDS signals to the connectors of the DVI connector 162 which are used by the pins of the DVI connector 194 in single link mode. The DVI video signal is then supplied to monitor 110 for display. Hence, an extended range, single link DVI signal path between computer 102 and remote monitor 110 can be provided.

However, the transmitter 104 and receiver 108 of the invention can also provide effectively a dual link DVI signal path using the same four twisted wire pair cable 106.

Figure 6:
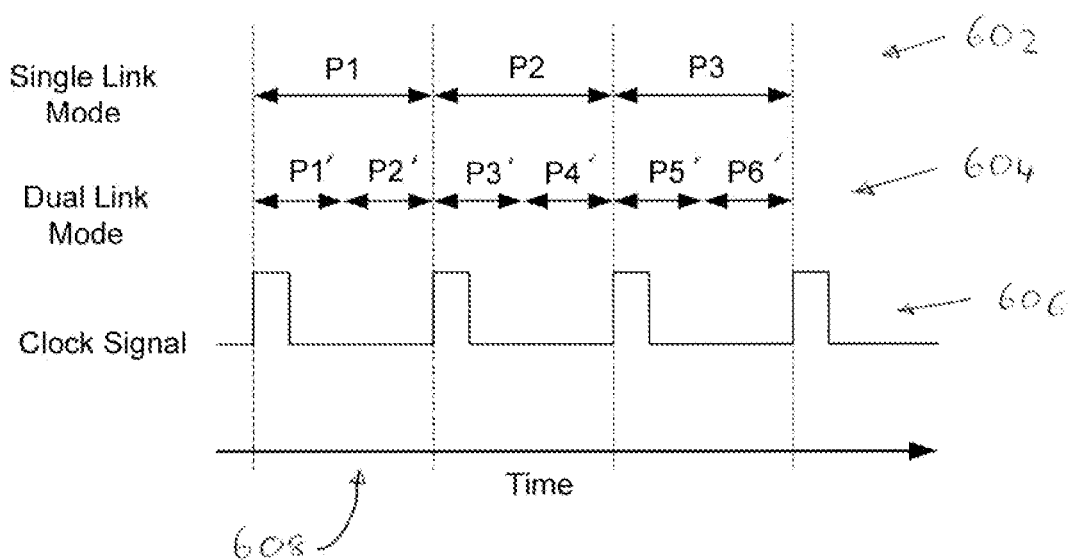
FIG. 6 shows a diagram illustrating the conceptual relationship between pixel data and a video timing signal.

In the dual link mode of operation, pixels are transmitted at approximately twice the rate as for the single link mode of operation. This is illustrated conceptually in FIG. 6 which illustrates the transmitted pixels in single 602 and dual link 604 mode and the pixel clock signal 606 as a function of time 608. Pixel clock signal 606 is illustrated as a square wave although it will be appreciated that any suitable periodic signal can be used as the clock signal. The pixel clock signal has a constant frequency, for any particular display resolution, up to 165 MHz for DVI for single link. Also, although the clock signal is shown as being synchronised with the pixel data, e.g. P1, there can be an offset of, or phase difference between, the clock signal and pixel data, so long as the clock signal can be used to disambiguate the data for different pixels.

In the single link mode of operation, 602, all the colour video data used for the first pixel, P1, is sent during a first cycle of the pixel clock signal 606. Then, all the colour video data for the second pixel, P2, is sent during the next clock cycle, and then of the third pixel, P3, and so on. In the single link mode, the video colour signal for each pixel comprises 10 bits for each component, e.g. R, G, B or Y, Cr, Cb. Hence, for each pixel clock cycle, 10 bits of data are sent on each of the three twisted wire pairs for a respective one of the three colour components of the pixel.

However, in the dual link mode of operation, 604, on average, all the data used for two pixels, in the described embodiment Y, Cr or Cb, is sent during one clock cycle or time period. Hence, as further illustrated in FIG. 6, during a first clock cycle the data for a first pixel, P1', and also a second pixel, P2', are sent, and then during a second clock cycle the data for a third pixel, P3' and a fourth pixel, P4' are sent, and then for fifth and sixth pixels, P5' & P6', and so on. However as described in detail later, while the luminance data is sent for each pixel, the chrominance data for the pixels is spread over two video lines (alternately an averaged Cr or Cb) but, on average, the chrominance data required for two horizontally adjacent pixels is sent within one clock period. In the dual link mode of operation approximately half the amount of video colour data is used for each pixel. Hence, although the actual data rate of the cable is essentially the same, in terms of bits of data transmitted per second, the pixel transfer rate is doubled in the dual link mode of operation, compared to the single link mode, as, owing to compression of the colour video data, colour data for two pixels can be sent within the same time window as used for colour data for only a single pixel in the single link mode.

The transmitter video circuitry 130 illustrated in FIG. 2 also includes a colour space conversion module 220. The colour space conversion module 220 can convert colour video data from 4:4:4 RGB format into 4:4:4 YCrCb format. As is known in the art, in the 4:4:4 RGB video format, the red, green and blue signal values for a pixel are each sampled for every pixel. So colour data in the 4:4:4 RGB format is provided for each pixel to be displayed. This RGB data can then be encoded using YCrCb which represents a relative colour space. In YCrCb, Y denotes the luminance, or Y' denotes luma, in which luminance differs from luma in that the light intensity has been non-linearly encoded using gamma correction. The Cr component and Cb component are each chroma components, and Cr is the red-difference chroma component and Cb is the blue-difference chroma component. So the colour space converter module converts the received 4:4:4 RGB data for each pixel into corresponding 4:4:4 YCrCb data.

As can be seen in FIG. 2, the colour space converter 220 has a first input connected to a first output 222 of the de-skew device 208 and a second input connected to a second output 224 of the de-skew device. When a dual link DVI cable is connected, 1st TMDS decoder 202 receives and decodes the RGB data for a first pixel and 2nd TMDS decoder 204 receives and decodes the RGB data for a second pixel. After de-skewing any timing differences between the first pixel data and the second pixel data by de-skew device 208, the RGB data for the first pixel is output from 222 to the colour space converter and then the RGB data for the second pixel is output from 224 to the colour space converter. The input to the colour space converter then keeps alternating as RGB data for subsequent pixels is alternately received by the 1st and 2nd TMDS decoders, e.g. the 3rd and 4th pixels. Following colour space conversion the 4:4:4 YCrCb data which originated at the 1st TMDS encoder, i.e. 1st YCbCr in FIG. 2, is supplied at a first input 226 to a chroma sub-sampling device 230. The 4:4:4 YCrCb data which originated at the 2nd TMDS encoder, i.e. 2nd YCbCr in FIG. 2, is supplied at a second input 228 to the chroma sub-sampling device 230. The chroma sub-sampling device 230 operates to halve the amount of data used to describe the YCbCr representation of the video colour data by converting it into a different 4:2:0 YCbCr sub-sampled format.

Figure 4:
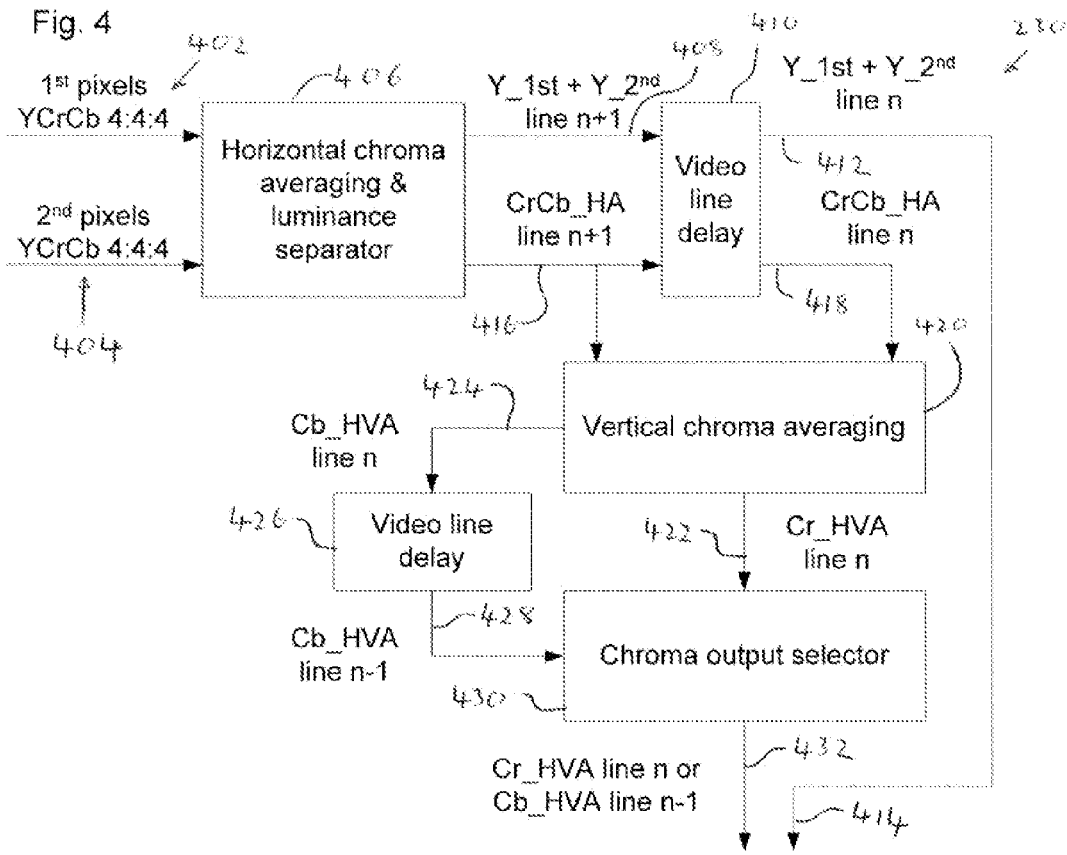
FIG. 4 shows a schematic block diagram of a sub-sampler part of the transmitter shown in FIG. 2.

The construction and operation of the chroma sub-sampler 230 will be described with reference to FIG. 4. As discussed above, the chroma sub-sampler 230 receives as input 4:4:4: YCbCr data 402 for pixels originating from the 1st TMDS encoder 202 and also 4:4:4 YCbCr data 404 for pixels originating at the 2nd TMDS encoder 204. Data for alternate pixels is received, i.e. pixel 1 at 402, then pixel 2 at 404, pixel 3 at 402, pixel 4 at 404, etc. A first processing block 406 separates out the luminance data Y and outputs the luminance data for pixels received from the 1st and 2nd TMDS encoders on a first output 408. A video line delay component 410 receives the luminance data Y for each pixel in sequence and buffers the incoming pixel data until all data for all the pixels of a complete video display line have been received. The video line delay component, then outputs the luminance data Y for a complete line of video on an output 412, and starts to receive luminance data for all the pixels for a next video line. Hence, video line delay component 410 introduces a delay corresponding to one video line and outputs luminance data Y for an earlier video line, nth line, while receiving video data for a next, later video line, n+1th line. The full original luminance data, i.e. un-sampled, is then supplied on a line by line basis as an output 414 to the switch 210.

However, the chroma data is averaged in order to halve the amount of data to be sent over the twisted wire pair cable. The chroma data is averaged over a 2 pixel by 2 pixel area or block so there is only one chroma pixel for every four luma pixels transmitted.

In greater detail, first processing block 406 calculates the average Cr value and the average Cb value for pairs of pixels. So it calculates an average of Cr and average of Cb for 1st and 2nd pixels of a line, then for 3rd and 4th pixels of a line, then for 5th and 6th pixels, etc. This provides a horizontal average value for Cr and Cb for sequential pairs of pixels for a video line—CrCb_HA—which is provided as output 416 and supplied to the video line delay device 410 which acts as described above to buffer data for a complete video line and introduce a one video line delay, between the input data, for a later line, line n+1, CrCb_HA line n+1, and the output 418 of data for the preceding video line, line n, CrCb_HA line n.

The sub-sampler circuitry 230 also includes a processing block 420 for chroma averaging over vertical pixels, i.e. vertically arranged pairs of pixels of adjacent video lines. The vertical chroma averaging block 420 receives the horizontally averaged Cr and Cb data for vertically adjacent pairs of video lines, lines n and n+1. Block 420 calculates an average Cr value for vertical pairs of pixels on lines n and n+1 and which is provided at an output 422 as a horizontally and now vertically averaged Cr value for line n–Cr_HVA line n. Block 420 also calculates an average Cb value for vertical pairs of pixels on lines n and n+1 and which is provided at an output 424 as a horizontally and now vertically averaged Cb value for line n–Cb_HVA line n. A further video line delay block 426 is provided which again acts as a buffer, like block 410, to accept Cb_HVA data for adjacent pairs of pixels on a video line, e.g. pixels 1 and 2, pixels 3 and 4, pixels 5 sand 6, etc., until a full video line is received and then the horizontally and vertically averaged Cb data for a video line is provided at an output 428. It will be appreciated that as block 426 introduces a video line delay, its output relates to a video line preceding the data at its input, for line n, and is indicated by referring to video line n−1 in FIG. 4.

Chroma sub-sampler 230 also includes a block 430 which acts to select which of the horizontally and vertically averaged the chroma data to output on a line by line basis. The chroma output selector block 430 receives as input Cr_HVA for line n and Cb_HVA for line n−1, being a preceding line. Chroma output selector block 430 alternates between outputting the horizontally and vertically averaged Cb value Cb_HVA on even video lines, 2, 4, 6, etc., and horizontally and vertically averaged Cr value Cr_HVA on odd video lines, 1, 3, 5, etc. as output 432.

Hence, chroma sub-sampler 230 provides as its output the full luma component for each pixel on each video line at 414 and either horizontally and vertically averaged Cb values for each even video line and horizontally and vertically averaged Cr values for each odd video line. The sub-sampled video data output is therefore in 4:2:0 YCrCb format with full luminance resolution but reduced Cb and Cr chroma resolution. This halves the required amount of video signal data for 4:2:0 compared to that required for full 4:4:4 resolution, i.e. from 4+4+4=12 samples down to 4+2+0=6 samples. Hence, dual link DVI can be carried over the same twisted wire pair cable, at a higher pixel transfer rate, and then displayed using the same pixel clock frequency, as single link DVI.

As illustrated in FIG. 3, the receiver video circuitry 160 includes a chroma up-sampler module 330 which effectively provides the reverse effect of transmitter sub-sampler 230, and also a colour space converter 340 which effectively provides the reverse effect of transmitter colour space converter 220, and converts between colour space representations form the received YCrCb data back into 4:4:4 RGB data.

Figure 5:
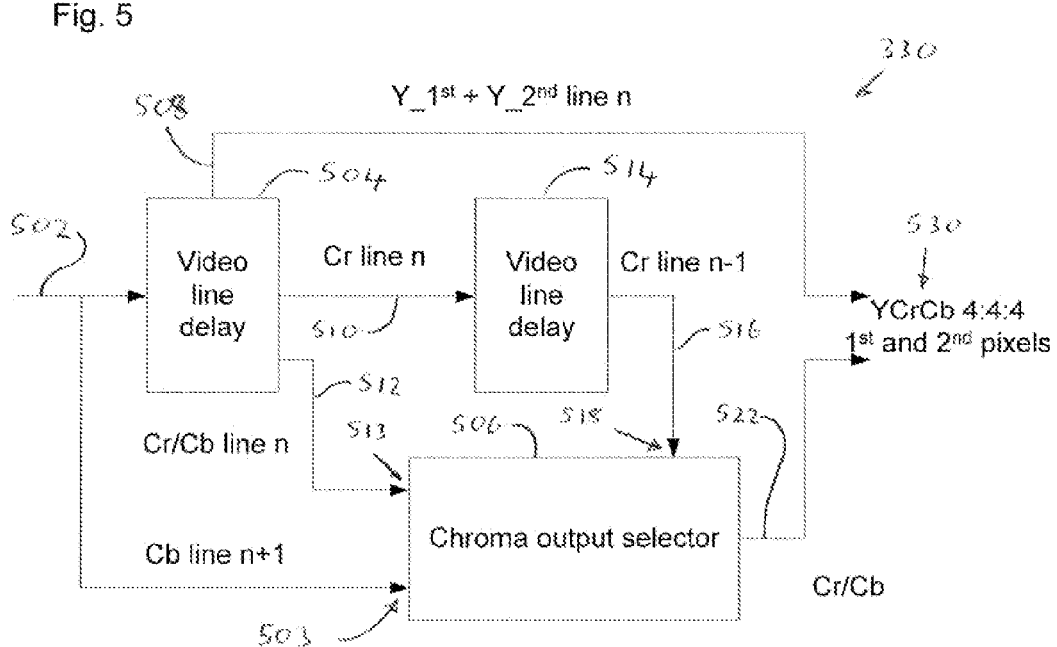
FIG. 5 shows a schematic block diagram of an up-sampler part of the receiver shown in FIG. 3.

FIG. 5 shows a schematic block diagram of the chroma up-sampler circuitry 330. The chroma up sampler receives the 4:2:0 YCrCb data and creates a 4:4:4 format version. An input 502 receives full resolution luminance data for each pixel for each video line and Cb_HVA and Cr_HVA for alternate video lines. A first video line delay block 504 receives the input data which is also supplied as a first input 503 to a block for selecting which chroma data to output 506. As described above, video line delay block provides a buffer for storing a video lines' worth of data so as to introduce a delay of one video line between its output and input. Hence, if video line n+1 is being input, then video line delay block 504 outputs data for the preceding line, i.e. line n. Video line delay block 504 has three outputs. A first output 508 simply outputs the full resolution luminance data Y for each pixel of the video line, e.g. pixel 1, 2, 3, 4, etc., for the preceding video line, line n, and which are finally output to colour space converter 340 at 530.

A second output 510 outputs the horizontally and vertically averaged Cr data for line n to a second video line delay block 514 similar to video line delay block 504. The second video line delay block operates like block 504 and introduces a delay of one video line and hence provides horizontally and vertically averaged Cr data for a preceding line as it received data for a current line. Hence, output 516 supplies Cr_HVA for video line n−1. That data is supplied to a third input 518 of chroma output selector 506. A third output 512 outputs the horizontally and vertically averaged Cr and Cb data for line n to a second input 513 of the chroma output selector 506. Chroma output selector operates as follows. For odd video lines, it supplies at output 522, Cb_HVA for line n+1 and Cr_HVA for line n. For even video lines, it supplies at output 522, Cb_HVA for line n and Cr_HVA for line n−1. Hence, although horizontally and vertically averaged Cr and Cb data is used, the chroma up-sampler outputs the full data 4:4:4 format YCrCb signal at 530, for each pixel.

Returning to FIG. 3, 4:4:4 YCrCb data is output on a pixel by pixel basis on first 332 and second 334 channels to the colour space converter 340 which converts the 4:4:4 YCrCb data for each pixel back into 4:4:4 RGB data. The 4:4:4 RGB data 342 for the first link of the dual link connection is output to a second input 346 of the switch 310 and the 4:4:4 RGB data 344 for the second link of the dual link connection is output to a third input 348 of the switch 310. Hence, when dual link operation is detected, switch 310 is operated to connect the second input 346 to first output 312 to supply 4:4:4 RGB data to the first TMDS output encoder 316 and to connect the third input 348 to second output 314 to supply 4:4:4 RGB data to the second TMDS output encoder 318. The same pixel clock signal 320 is supplied to the first TMDS encoder so that the dual link DVI connection can be completed by sending colour data over six channels of the dual link DVI connection and a common pixel clock signal over a seventh channel of cable 190.

Although sub-sampling is only used in the dual link mode, it will be appreciated that both the uncompressed RGB 4:4:4 data transmitted in the single link mode and also the YCrCb 4:2:0 data transmitted in the dual link mode can be considered digital colour samples, but simply using different colour space representations (RGB compared with YCrCb) of the video colour signal and with different numbers of samples (4:4:4 compared to 4:2:0).

Hence, the first embodiment of the invention allows a single-link capable extender to also handle dual link resolutions without having to change the clock frequency. There is a synergy to this approach as dual-link resolutions can require up to double the data rate and chroma sub-sampling can be used to halve the required amount of data to be transmitted. Furthermore, it has been found that in practice 4:2:0 chroma sub-sampled video provides an excellent video picture when applied to high resolution screens. Indeed in practice most users cannot discern any difference. This may be partly due to the very small pixel size on such screens. Furthermore, the invention implements sending every pixel without chroma sub-sampling when the system detects single link incoming video. This approach enables the invention to deliver pixel perfect video when the bandwidth is available to support this.

Also, the data compression and expansion approaches used in the invention do not require a frame store to be used in either the transmitter or the receiver. A constant compression ratio and expansion ratio is used so that the amount of data is halved for transmission and then doubled to reproduce the original resolution in a constant manner rather than the amount of compression being variable, for example by being determined on a frame by frame basis. Further, the invention carries out the compression and expansion using only lines of video data or pixels and rather than entire frame and in particular uses video line delay elements to introduce delays between video lines to allow averaging before transmission or to increase the resolution after transmission.

The invention can also be applied to other digital video standards such as HDMI and DisplayPort.

Hence, a second embodiment of the invention allows the extension of HDMI video signals over a significant distance. HDMI ports share many similarities with DVI ports and in many cases are mostly interchangeable using widely available adapters. However, common HDMI ports usually run at higher clock speeds to deliver higher resolutions rather than employing the dual link technique used on DVI interfaces. However, the invention may also be applied to HDMI interfaces as described below.

Figure 7:
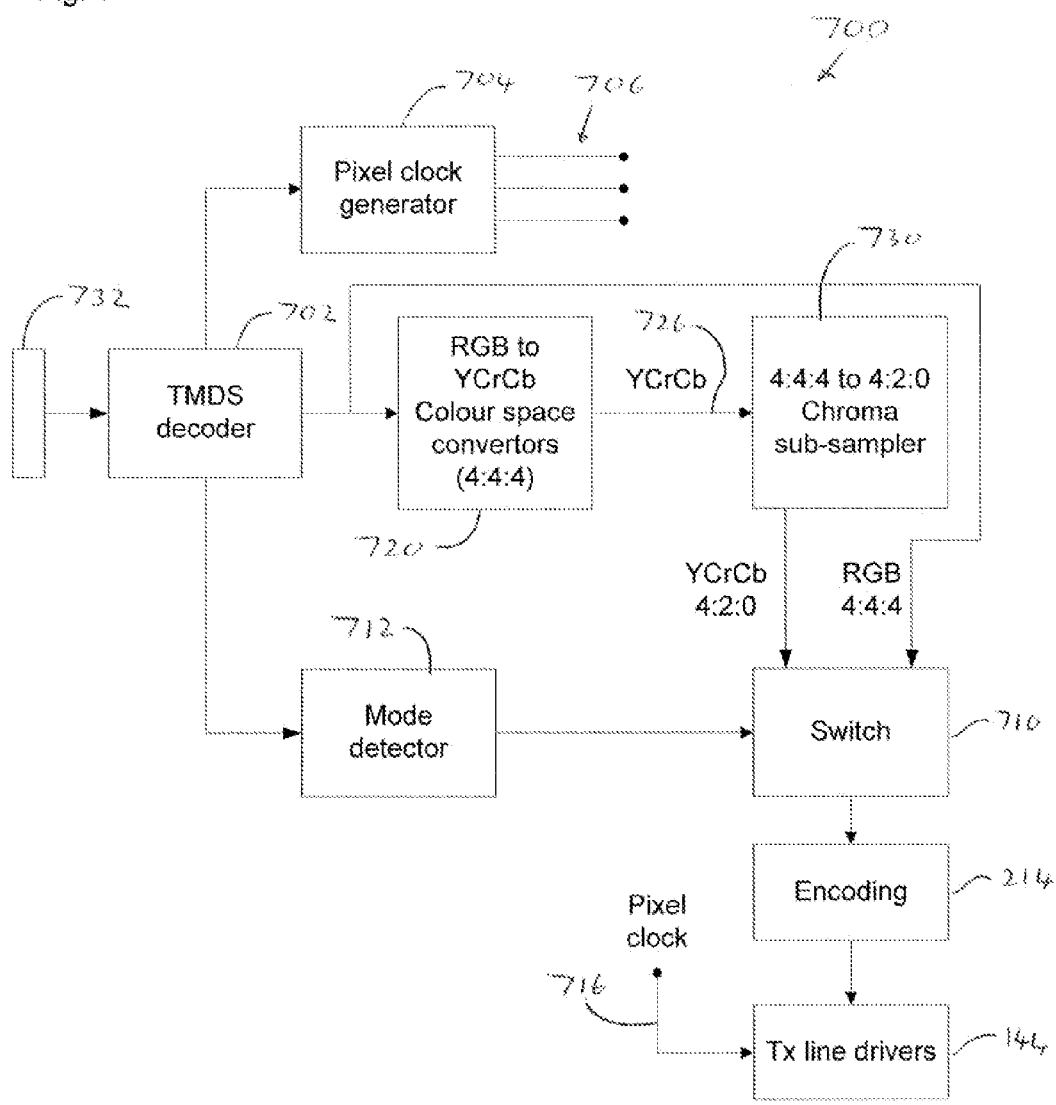
FIG. 7 shows a schematic block diagram of a second embodiment of a transmitter part of the video signal transmission system shown in FIG. 1.
Figure 8:
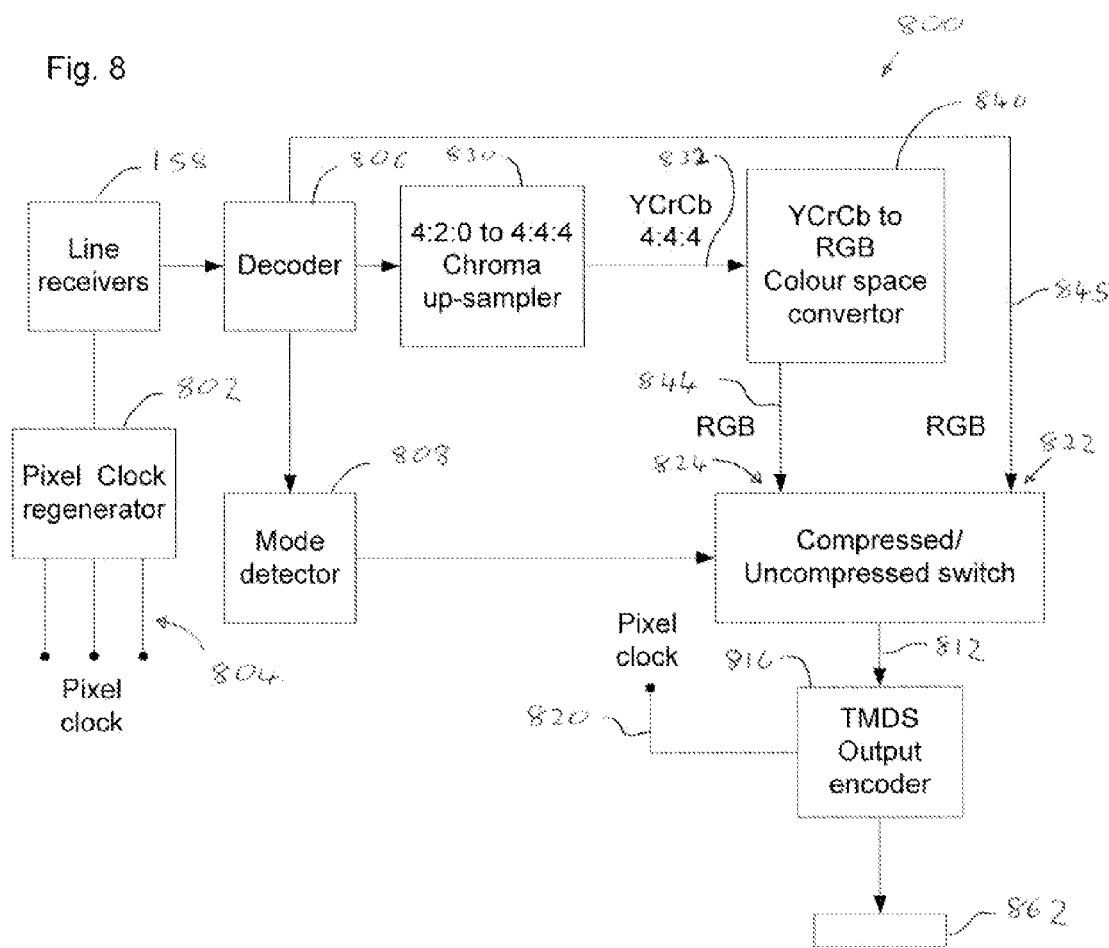
FIG. 8 shows a schematic block diagram of a second embodiment of a receiver part of the video signal transmission system shown in FIG. 1.

FIGS. 7 and 8 show schematic block diagrams of the video transmitter 700 and video receiver 800 of the invention, and correspond generally to FIGS. 2 and 3 but adapted to handle HDMI. A number of the elements are common to the DVI embodiment of the invention and so the following discussion focusses on the differences which are specific to HDMI compared to DVI.

With reference to FIG. 7, there is shown a schematic block diagram 700 of the video circuitry 130 of the transmitter 104 shown in FIG. 1. The video circuitry includes a standard HDMI female connector 732 which can support HDMI version 1.3 and clock speeds up to 340 MHz, and which allows for higher resolutions such as WQXGA (2560×1600) across a cable with a single set of RGB colour signals. An HDMI 1.3 port is capable of supporting approximately the same resolutions over a single link that would require dual DVI 165 MHz links. An extension link between a transmitter and a receiver that is capable of supporting uncompressed single-link DVI signals will also be capable of supporting uncompressed HDMI signals with a clock frequency below 165 MHz. Hence, in the second embodiment the detectors used in the first embodiment to detect whether the system is operating in DVI single link or dual link modes are replaced with pixel clock frequency detectors.

The clock frequency detector 712 receives the clock signal from a single TMDS decoder 702 and detects the frequency of the pixel clock signal. The frequency detector 712 also includes a thresholding device or circuit to compare the detected frequency with a mode threshold which can be set to 165 MHz. If the detected clock frequency is below 165 MHz, then the system operates in an uncompressed mode in which the uncompressed digital video data RGB 4:4:4 is supplied by switch 710 to the encoder 214 for transmission by the line drivers 144. The clock frequency detector circuit outputs a signal to set switch 710. If the detected frequency is above 165 MHz, then the signal sets switch 710 to supply the compressed digital video data YCrCb 4:2:0 to the encoder 214 for transmission. Most of the remaining elements of the HDMI embodiment are the same or similar to the first DVI embodiment and are numbered similarly, but with a numeral 7 prefix.

The single TMDS decoder 702 receives the TMDS encoded red, green and blue components of the HDMI video signal and a pixel clock signal and outputs the decoded clock signal and red, green and blue video signals. The transmitter circuit 700 includes a pixel clock generator circuit 704 in communication with the TMDS decoder 702 and which receives the decoded pixel clock signal and outputs a plurality of pixel clock signals on a plurality of lines 706 which are supplied to other parts and components of the video circuitry 700.

The mode detection device 712 is connected to the TMDS decoder 702 and measures the pixel clock frequency. When the pixel clock frequency is detected as being over 165 MHz the mode detection device 712 outputs a signal signifying a higher frequency mode of operation to the switch 710 which switches to connect a second input receiving the chroma sub-sampled video data YCrCb 4:2:0. Otherwise, mode detection device 712 outputs a signal to switch 710 to connect its first input receiving uncompressed RGB data to its output.

The output of the switch 710 is connected to an encoder 214 which encodes the received video data using 8b 10b encoding and supplies red, green and blue video signals in 4:4:4 RGB video format to line driver circuit 144 to transmit each of the red, green and blue video signals differentially over a different respective one of three of the twisted wire pairs of cable 106. The pixel clock signal is also supplied by line 716 to the line driver circuit 144 for transmission over the twisted wire pair cable 106.

As can also be seen in FIG. 7, the colour space converter 720 has a first input connected to the TMDS decoder 702 to receive RGB video data. In the case of this second HDMI embodiment, adjacent pixels of a pair of pixels, which are referred to as 'first' and 'second' pixels, are received over the same input. Following colour space conversion the 4:4:4 YCrCb data for each pixel is supplied sequentially at an input 726 to a chroma sub-sampling device 730. The chroma sub-sampling device 730 operates to halve the amount of data used to describe the YCbCr representation of the video colour data by converting it into a different 4:2:0 YCbCr sub-sampled format.

The construction and operation of the chroma sub-sampler 730 is similar to the chroma sub-sampler 230 previously described with reference to FIG. 4, except that the first pixel and second pixel YCrCb 4:4:4 data for each pair of pixels arrives over the same input 726 sequentially. Hence, Chroma sub-sampler 730 provides as its output the full luma component for each pixel sequentially for each video line at 414 and either horizontally and vertically averaged Cb values for each even video line and horizontally and vertically averaged Cr values for each odd video line at 432. The sub-sampled video data output is therefore in 4:2:0 YCrCb format with full luminance resolution but reduced Cb and Cr chroma resolution. This halves the required amount of video signal data for 4:2:0 compared to that required for full 4:4:4 resolution, i.e. from 4+4+4=12 samples down to 4+2+0=6 samples. Hence, HDMI signals with clock frequencies between 165 MHz and 330 MHz can be carried over a communications channel would not otherwise be capable of carrying such high frequency digital video signals.

Whenever a new or changed video resolution is detected from the video source, the three twisted wire pairs used to transmit the video colour data are switched briefly (e.g., for less than a second) to a different mode which carries a continuous clock signal on two of the twisted wire pairs and a first or a second low-frequency signalling 'tone' on a third of the twisted wire pairs. The transmitted tone signal is used by the receiver to detect this special mode of operation and also to detect whether the system is to operate in compressed or uncompressed mode. Two different low-frequency signalling tones are used, a first to indicate uncompressed mode and a second to indicate compressed mode, as a way of transmitting this information to the receiver 108 before any actual video colour data is transmitted. A pixel clock regenerator circuit 802 of the receiver accurately measures and stores the clock frequency, and sets the clock regeneration circuit to generate a local clock signal at the same frequency. The clock regeneration circuit uses the received video pixel colour data to fine trim the clock signal so that it remains approximately phase locked with the data. Techniques for synchronising clock signals to data in this way are generally known in the art.

With reference to FIG. 8, there is shown a schematic block diagram 800 of the video circuitry 160 of the receiver 108. The receiver video circuitry 800 is essentially constructed and operates as a mirror image of, or in reverse to, the transmitter video circuitry 700. The receiver video circuitry 800 includes differential mode line receiver circuitry 158 which receives the signals differentially transmitted over the four twisted wire pairs of cable 106. As noted above, the line receiver circuit 158 outputs the transmitted pixel clock signal to a pixel clock regeneration circuit 802 which measures the transmitted clock signal frequency and generates and outputs a plurality of local pixel clock signals on a plurality of lines 804 for use by other parts or components of the video circuitry 800. As noted above, the pixel clock regenerator circuit 302 accurately measures and stores the clock frequency, and sets the clock regeneration circuit to generate a local clock signal at the same frequency. The clock regeneration circuit uses the received video pixel colour data to fine trim the clock signal so that it remains approximately phase locked with the received video pixel colour data. Techniques for synchronising clock signals to data in this way are generally known in the art.

The R, G and B video signals encoded in 8b10b format are received over three of the twisted wire pairs and are passed as output from the receiver circuitry to a decoder 806 which decodes the video data out of 8b10b format. An output of decoder 806 is connected to as an input to a mode detection device or circuit 808. This mode detection circuit detects the tone signal that is transmitted during a video mode change to determine if the data to be transferred over the twisted wire pair is compressed or uncompressed. An output of this mode detector is connected as an input to a switch 810. Switch 810 has an output 812 connected as an input to a TMDS output encoder 816. The output of the TMDS encoder 816 is connected to the standard HDMI female connector 862. The TMDS output encoder 816 also receives as an input the pixel clock signal on line 820.

The switch 810 has a first input 822 in communication with a first output of the decoder 806 and which can receive the decoded 4:4:4 RGB video signal from decoder 806 in an uncompressed mode of operation. The switch 810 also has a second input 824 which can receive another video signal in a compressed mode of operation. The detector circuit 808 outputs a signal signifying the compressed mode of operation and switch 810 operates to connect its second input 824 to its output 812 respectively. Otherwise, the mode detector circuit 808 outputs a signal signifying the uncompressed mode of operation and switch 810 operates to connect its first input 822 to its output 812.

As also illustrated in FIG. 8, the receiver video circuitry 800 includes a chroma up-sampler module 830, which effectively provides the reverse effect of transmitter sub-sampler 730. A colour space converter 840 is also provided which effectively provides the reverse effect of transmitter colour space converter 720, and converts between colour space representations from the received YCrCb data back into 4:4:4 RGB data. The chroma up-sampler 830 operates in a similar manner to chroma up-sampler 330 as previously described and illustrated in FIG. 5. The YCrCb to RGB colour space converter 840 operates in a similar manner to YCrCb to RGB colour space converter 340 as previously described, although in this case the data is transferred sequentially over single connections 832 and 844, rather than the dual connections 332, 334 and 342, 344 used in the previously described embodiment.

It can be seen that when mode detector 808 indicates to switch 810 that the data that has been transmitted over the extension link is compressed then the switch operates to select the RGB data on line 844, that was transmitted in the compressed format, from the colour space converter to be sent to its output 812 and that otherwise it will select the RGB data on line 845, that was transmitted in the uncompressed format. The pixel clock signal 820, supplied to the TMDS output encoder, will be above 165 MHz when the compressed RGB data 844 is selected and will be at or below 165 MHz when the uncompressed data feed 845 is selected.

Other embodiments of the invention may handle signals for other digital video standards.

For example, a third embodiment of the invention can be configured to handle Display Port video signals. The third embodiment for DisplayPort is constructed in a similar manner and operates similarly to the second embodiment for HDMI signals. However, instead of using the clock signal frequency to determine whether to operate in a compressed mode, and transmit compressed digital video data, or an uncompressed mode, and transmit uncompressed digital video data, the speed and configuration of the incoming signal to the transmitter can be determined by snooping a link training signal on the DisplayPort auxiliary channel DisplayPort supports 1, 2 or 4 lanes of data, whereby each lane can operate at up to 1.62 Gb/s, 2.7 Gb/s or 4 Gb/s. During a link training phase, the source and sink negotiate the number of lanes that will be used and the speed of each lane. To a rough approximation, two lanes of 2.7 Gb/s supports resolutions that are equivalent to single-link DVI resolutions. To a rough approximation, four lanes of 2.7 Gb/s or two lanes of 5.4 Gb/s supports resolutions that are equivalent to dual-link DVI resolutions. Hence, the transmitter can determine whether to compress the data before transmission or not by determining if the aggregate data rate (i.e. number of lanes times lane data rate) of the negotiated link characteristics is lower than or more than 5.4 Gb/s. Similarly to the above description, a tone signalling technique can be used to notify the receiver whether it will be receiving compressed or uncompressed data and the receiver can then set the decoder 806 and switch 810 accordingly to either supply uncompressed or compressed RGB to the TMDS output encoder 816.

Hence, the third embodiment of the invention uses DisplayPort interfaces at the transmitter and receiver ends instead of DVI interfaces. Unlike DVI and HDMI, DisplayPort interfaces do not have fully variable pixel clocks but instead transmit the pixel data using one of a set of fixed signalling speeds over up to four signalling channels. Although the signalling between the source and the transmitter and between the receiver and the sink is different in the case of DisplayPort, the same principle applies of fitting a larger number of pixels per second across an extension link that is not capable of carrying the data in an uncompressed manner. A noted above, in the case of the DisplayPort embodiment, the detector (equivalent to block 212) operates by snooping the DisplayPort AUX communications channel to detect the display mode that is negotiated. The detection block then makes a choice based on a threshold value. Otherwise, a similar technique is used to the other embodiments.

Although the invention has been described in the context of a KVM extender, it will be appreciated that the invention can be used in other devices and systems such as audio visual (AV) extenders and is not limited to KVM extenders, nor indeed to transmitting video signals between computers and monitors. Indeed the invention can be used to provide an extended range digital video data signal path between any source and sink of digital video data.

The invention also is not limited to using a twisted wire pair cable as the physical communications path between the transmitter and receiver. Various different types of physical layers can be used to provide the extension mechanism for transmitting over greater distances, e.g. 10 s of meters or hundreds of meters. For example, in some embodiments, a line driver at the transmitter and a line equaliser at the receiver can be used. In other embodiments, HDBaseT extension technology can be used in the transmitter and receiver. In other embodiments optical extension technology can be used in the transmitter and receiver.

The invention is also not limited to the DVI standard and can be used to transmit any type of digital video data which uses colour data signals and in which the colour data is capable of compression so as to increase the rate of pixel transmission. It will be appreciated that different colour space converters may be used if the original video data is not in RGB format.

The invention claimed is:

1. A video transmission system, comprising:
a transmitter having:
an input arranged to receive a digital video signal having a frame rate and wherein the digital video signal has a resolution within a range of resolutions;
a detector configured to detect whether the resolution of the received digital video signal is in a lower resolution range or a higher resolution range;
a colour space converter configured to convert RGB video data into luminance video data and chrominance video data;
a compressor configured to compress luminance video data and chrominance video data of the received digital video signal by a constant compression ratio when the detector detects that the resolution of the received digital video signal is in the higher resolution range and wherein no compression is applied to video colour data of the received digital video signal when the detector detects that the resolution of the received digital video signal is in the lower resolution range; and
an output arranged to transmit frames of digital colour samples at the same frame rate as the frame rate of the received digital video signal; and
a receiver having:
an input arranged to receive frames of digital colour samples from the transmitter;
a detector configured to detect whether the received digital colour samples were transmitted in a compressed format or an uncompressed format;
an expander configured to expand the received compressed digital colour samples by a constant expansion ratio when the detector detects that the received digital colour samples were transmitted in a compressed format, and wherein no expansion is applied to the received digital colour samples when the detector determines that the received digital colour samples were transmitted in the uncompressed video format;
a colour space converter configured to convert luminance video data and chrominance video data from the expander into RGB video data; and
an output arranged to output a digital video signal with a resolution the same as the resolution of the digital video signal received at the input of the transmitter.

2. The video transmission system of claim 1, wherein the constant compression ratio is one half and the constant expansion ratio is two.

3. The video transmission system of claim 1, wherein the lower resolution range corresponds to single link DVI and the higher resolution range corresponds to dual link DVI.

4. The video transmission system of claim 1, wherein the lower resolution range corresponds to HDMI signal with a pixel clock frequency less than 165 MHz and the higher resolution range corresponds to HDMI signal with a pixel clock frequency greater than 165 MHz.

5. The video transmission system of claim 1, wherein the lower resolution range corresponds to a DisplayPort signal with an aggregate negotiated data rate less than 5.4 Gb/s and the higher resolution range corresponds to a DisplayPort signal with an aggregate negotiated data rate more than 5.4 Gb/s.

6. The video transmission system of claim 1, wherein the compressor of the transmitter comprises a chroma sub-sampler arranged to operate on the chrominance video data and the expander of the receiver comprises a chroma up-sampler arranged to operate on the chrominance video data.

7. The video transmission system of claim 6, wherein the chroma sub-sampler includes a first video line delay elements arranged to provide chrominance averaging over pixels of different video lines.

8. The video transmission system of claim 6, wherein the chroma sub-sampler includes a second video line delay element arranged to allow selection of a video line of an averaged first type of chrominance data and a video line of an averaged second type of chrominance data.

9. The video transmission system of claim 6, wherein the chroma up-sampler includes a first video line delay element arranged to allow selection of a first type of chrominance data and a second type of chrominance data for output on the same video line.

10. The video transmission system of claim 1, wherein the transmitter includes a switch operable by the detector either to supply the digital colour samples in the uncompressed format to the output of the transmitter or to supply the digital colour samples in the compressed format to the output of the transmitter and wherein the receiver includes a switch operable by the detector to supply the digital video signal including digital colour data obtained from the digital colour samples received in the uncompressed format to the output or to supply the digital video signal including digital colour data obtained from the digital colour samples transmitted in the compressed format.

11. The video transmission system of claim 1, and further comprising a cable connected between the transmitter and receiver and wherein the cable includes a plurality of twisted wire pairs.

12. The video transmission system of claim 11, wherein the cable includes only four twisted wire pairs and wherein the digital colour samples are can be transmitted over three of the twisted wire pairs and peripheral data can be transmitted over a fourth of the twisted wire pairs.

13. The video transmission system of claim 11, wherein the cable is at least 10 m long.

14. The video transmission system of claim 1, wherein the video transmission system comprises a KVM extender.

15. A video transmission method, comprising:
receiving a digital video signal having a frame rate at an input of a transmitter and wherein the digital video signal has a resolution within a range of resolutions;
detecting whether the resolution of the received digital video signal is in a lower resolution range or a higher resolution range;
compressing video colour data of the received digital video signal by a constant compression ratio when the resolution of the received digital video signal is detected to be in the higher resolution range and not compressing the video colour data of the received digital video signal when the resolution of the received digital video signal is detected to be in the lower resolution range;

operating a switch in the transmitter to supply digital colour samples in the uncompressed format or to supply digital colour samples in the compressed format to an output of the transmitter;

transmitting frames of digital colour samples from the output of the transmitter to an input of a receiver;

receiving frames of digital colour samples at the input of the receiver at the same frame rate as the video signal were transmitted by the transmitter;

detecting whether the received digital colour samples were transmitted in a compressed format or an uncompressed format;

expanding the received compressed digital colour samples by a constant expansion ratio when it is detected that the received digital colour samples were transmitted in a compressed format and not expanding the received digital colour samples when it is detected that the received digital colour samples were transmitted in the uncompressed video format;

operating a switch in the receiver to supply the digital video signal including digital colour data obtained from the digital colour samples in the uncompressed format or the digital video signal including digital colour data obtained from the digital colour samples in the compressed format to an output of the receiver; and outputting a digital video signal at the output of the receiver with a resolution the same as the resolution of the digital video signal received at the input of the transmitter.

16. The method of claim 15, wherein the constant compression ratio is one half and the constant expansion ratio is two.

17. The method of claim 15, wherein the lower resolution range corresponds to single link DVI and the higher resolution range corresponds to dual link DVI.

18. The method of claim 15, wherein the lower resolution range corresponds to a HDMI signal with a pixel clock frequency less than 165 MHz and the higher resolution range corresponds to a HDMI signal with a pixel clock frequency greater than 165 MHz.

19. The method of claim 15, wherein the lower resolution range corresponds to a DisplayPort signal with an aggregate negotiated data rate less than 5.4 Gb/s and the higher resolution range corresponds to a DisplayPort signal with an aggregate negotiated data rate more than 5.4 Gb/s.

20. The method of claim 15, further comprising the transmitter converting RGB video data into luminance and chrominance video data and the receiver converting luminance and chrominance video data into RGB video data.

21. The method of claim 20, wherein compressing comprises sub-sampling the chrominance video data and expanding comprises up-sampling the chrominance video data.

22. The method of claim 21, wherein sub-sampling the chrominance video data includes introducing a first video line delay to average chrominance over pixels of different video lines.

23. The method of claim 21, wherein sub-sampling the chrominance video data includes introducing a second video line delay and selecting a video line of an averaged first type of chrominance data or a video line of an averaged second type of chrominance data.

24. The method of claim 21, wherein up-sampling the chrominance video data includes introducing a first video line delay and selecting a first type of chrominance data and a second type of chrominance data for output on the same video line.

25. The method of claim 15, wherein the digital colour samples are transmitted over a cable including a plurality of twisted wire pairs.

26. The method of claim 25, wherein the cable includes only four twisted wire pairs and wherein the digital colour samples are transmitted over three of the twisted wire pairs.

27. The method of any of claim 15, wherein the digital video signal is transmitted over a distance of at least 10 m.

28. The method of claim 15, further comprising transmitting peripheral data from the receiver to the transmitter.

29. A video transmission system, comprising:
a transmitter having:
an input arranged to receive a digital video signal having a frame rate and wherein the digital video signal has a resolution within a range of resolutions;
a detector configured to detect whether the resolution of the received digital video signal is in a lower resolution range or a higher resolution range;
a compressor configured to compress video colour data of the received digital video signal by a constant compression ratio when the detector detects that the resolution of the received digital video signal is in the higher resolution range and wherein no compression is applied to video colour data of the received digital video signal when the detector detects that the resolution of the received digital video signal is in the lower resolution range;
an output arranged to transmit frames of digital colour samples at the same frame rate as the frame rate of the received digital video signal; and
a switch operable by the detector either to supply the digital colour samples in the uncompressed format to the output of the transmitter or to supply the digital colour samples in the compressed format to the output of the transmitter; and
a receiver having:
an input arranged to receive frames of digital colour samples from the transmitter;
a detector configured to detect whether the received digital colour samples were transmitted in a compressed format or an uncompressed format;
an expander configured to expand the received compressed digital colour samples by a constant expansion ratio when the detector detects that the received digital colour samples were transmitted in a compressed format, and wherein no expansion is applied to the received digital colour samples when the detector determines that the received digital colour samples were transmitted in the uncompressed video format;
an output arranged to output a digital video signal with a resolution the same as the resolution of the digital video signal received at the input of the transmitter; and
a switch operable by the detector to supply the digital video signal including digital colour data obtained from the digital colour samples received in the uncompressed format to the output or to supply the digital video signal including digital colour data obtained from the digital colour samples transmitted in the compressed format.

30. A video transmission system, comprising:
a transmitter having:
an input arranged to receive a digital video signal having a frame rate and wherein the digital video signal has a resolution within a range of resolutions;
a detector configured to detect whether the resolution of the received digital video signal is in a lower resolution range or a higher resolution range;

a compressor configured to compress video colour data of the received digital video signal by a constant compression ratio when the detector detects that the resolution of the received digital video signal is in the higher resolution range and wherein no compression is applied to video colour data of the received digital video signal when the detector detects that the resolution of the received digital video signal is in the lower resolution range; and an output arranged to transmit frames of digital colour samples at the same frame rate as the frame rate of the received digital video signal; and a receiver having:

an input arranged to receive frames of digital colour samples from the transmitter;

a detector configured to detect whether the received digital colour samples were transmitted in a compressed format or an uncompressed format;

an expander configured to expand the received compressed digital colour samples by a constant expansion ratio when the detector detects that the received digital colour samples were transmitted in a compressed format, and wherein no expansion is applied to the received digital colour samples when the detector determines that the received digital colour samples were transmitted in the uncompressed video format; and an output arranged to output a digital video signal with a resolution the same as the resolution of the digital video signal received at the input of the transmitter, wherein the lower resolution range corresponds to a HDMI signal with a pixel clock frequency less than 165 MHz and the higher resolution range corresponds to a HDMI signal with a pixel clock frequency greater than 165 MHz, or wherein the lower resolution range corresponds to a DisplayPort signal with an aggregate negotiated data rate less than 5.4 Gb/s and the higher resolution range corresponds to a DisplayPort signal with an aggregate negotiated data rate more than 5.4 Gb/s.

* * * * *